Oct. 10, 1939.   J. A. TORRI   2,175,767

SOUND-DEADENING ADHESIVE

Filed May 14, 1937

Inventor:
Joseph A. Torri.
By Chitton, Wiles, Davis, Hirsch & Dawson.
Attys.

UNITED STATES PATENT OFFICE 2,175,767

SOUND-DEADENING ADHESIVE

Joseph A. Torri, Kankakee, Ill., assignor to J. W. Mortell Company, a corporation of Illinois Application May 14, 1937, Serial No. 142,715

3 Claims. (Cl. 134—23.7)

This invention relates to an improved adhesive particularly adapted to the purpose of securing pads to sheet metal structures such as vehicle bodies, and the like.

The primary object of the invention is to provide an improved and inexpensive heat-resistant, non-inflammable, and non-toxic adhesive which may be readily applied by means of a brush or a spray gun.

Figure 1:
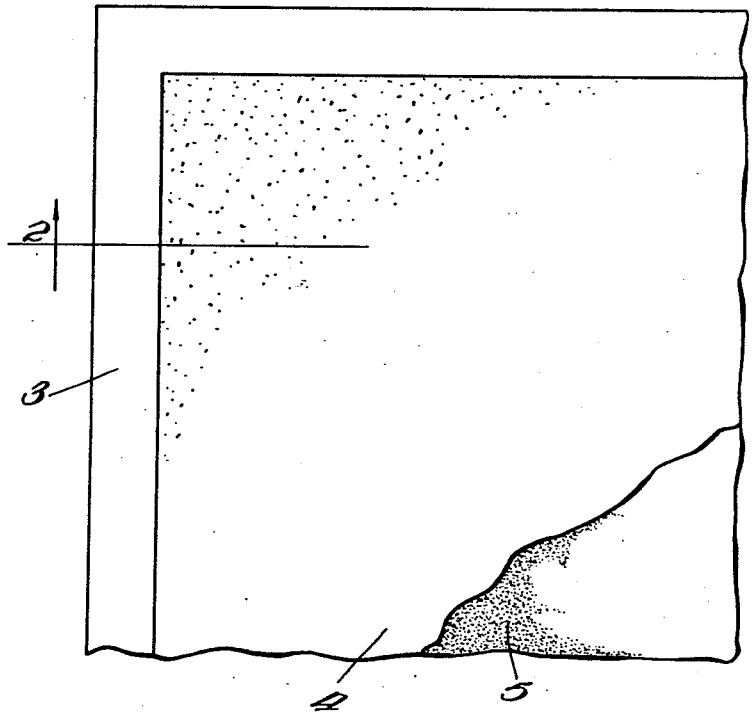
Figure 2:
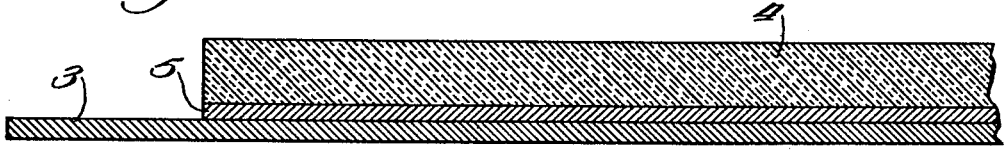

A further object of the invention is to provide an adhesive which will set or bond at ordinary room temperature and may be subjected immediately, if desired, to temperatures up to 500° F., as in passing through an enamel drying oven, without losing its adhesive powers by becoming brittle. The adhesive, accordingly, is particularly adapted for use in production lines of automobile industries, and the like. A further important purpose of the invention is to provide an adhesive which may be used to cement sound-insulating pads to sheet metal panels, and the like, and has definite sound-deadening properties itself. The use of the adhesive is illustrated in the accompanying drawing, in which:

Figure 1 is a fragmentary view of a steel panel provided with an insulating pad which is secured to the panel by means of the improved adhesive; and Fig. 2 is a sectional view, taken as indicated at line 2 of Fig. 1.

In the embodiment illustrated, a steel panel 3, such as is used in automobile bodies, automobile doors, or the like, is provided with a sound-insulating pad 4 which may be made of felt, paper, jute, or the like, and is cemented in position by means of the improved adhesive 5 which may have been sprayed or brushed on either or both of the surfaces to be joined. In order to obtain the best results, the metal plate should be clean and free from oil. Heretofore, latex, rubber, silicate of soda, and other materials have been used by themselves as an adhesive for this purpose but were unable to stand the high temperatures, in the neighborhood of 400° F., encountered in paint drying ovens. When latex or rubber was used, it was found that the rubber deteriorated rapidly, and silicate of soda by itself, became brittle. It has been the practice, by some manufacturers, to use a large amount of emulsified asphalt to effect adhesion but even this adhesive has frequently failed, especially if the unit does not reach the baking ovens promptly. It has been found that in using the present invention only about half the amount of adhesive heretofore used is necessary. The adhesive is applied cold and may be air dried or baked, as desired.

I have found that a very superior adhesive can be produced by the proper admixture of emulsified asphalt, silicate of soda (40° Bé.) and the addition of a suitable amount of inert material which may be porous or non-porous, granular or pulverized, such as Illinois clay, china clay, "Pelenite", silica, and sand, individually or in desired combinations. A typical example of a preferred proportion of the various ingredients is as follows:

| | Parts by weight |
|---|---|
| Emulsified asphalt | 12 |
| Silicate of soda (40° Bé.) | 60 |
| Clay ("Pelenite") | 28 |

It is believed that the improved results are due to the emulsified asphalt preventing the adhesive from setting too quickly and preventing the adhesive from becoming brittle upon aging; the silicate of soda giving fast setting properties to the adhesive; and the clay making the adhesive suitable for spraying or brushing. A gallon of an adhesive of the proportions described above is sufficient for taking care of 100 square feet of panel.

Careful tests show that an adhesive of this character, applied half as thick as an ordinary emulsified asphalt adhesive, will improve the sound-deadening or dampening value of the assembly approximately 30%.

The emulsified asphalt, used in the adhesive, may be made in the well-known manner. 50 parts by weight of Mexican asphalt (melting point 105° F.) is heated to the neighborhood of 290° to 300° F.; 3 parts of clay may be dissolved in 47 parts of water having a temperature of about 90° F., and the latter added to the asphalt in an emulsifying machine. After the emulsifying operation, it may be cooled and stored until ready for use. The emulsion is very stable.

A preferred way of forming the adhesive material is to place the emulsified asphalt in a mixer and agitating the asphalt while adding about one-half of the silicate of soda called for by the above formula. After this is thoroughly mixed, the inert material is added to the mixture and after this has been thoroughly stirred in, the remainder of the silicate of soda is added and thoroughly mixed into the composition.

I have used clay in the above formula which has a specific gravity of about 2.4, will pass through a 325 mesh screen and weighs about 45 pounds per cubic foot.

The foregoing detailed description has been given for clearness of understanding only, and no unnecessary limitations should be understood therefrom, but the appended claims should be construed as broadly as permissible, in view of the prior art.

I claim:

1. A non-inflammable sound-deadening adhesive material, adapted to secure pads to sheet metal, comprising: approximately 60 parts silicate of soda, 12 parts emulsified asphalt, and 28 parts of inert filler.

2. An adhesive as specified in claim 1, in which the inert material is pulverized clay.

3. An adhesive as specified in claim 1, in which the inert material is silica and sand.

JOSEPH A. TORRI.